(12) United States Patent
Bai et al.

(10) Patent No.: US 11,216,924 B2
(45) Date of Patent: Jan. 4, 2022

(54) METHOD AND APPARATUS FOR PROCESSING IMAGE

(71) Applicant: Baidu Online Network Technology (Beijing) Co., Ltd., Beijing (CN)

(72) Inventors: Ti Bai, Beijing (CN); Xin Li, Beijing (CN); Xiao Liu, Beijing (CN); Xiang Zhao, Beijing (CN); Fan Yang, Beijing (CN); Xubin Li, Beijing (CN); Hao Sun, Beijing (CN); Shilei Wen, Beijing (CN); Errui Ding, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/509,197

(22) Filed: Jul. 11, 2019

(65) Prior Publication Data

US 2020/0027203 A1    Jan. 23, 2020

(30) Foreign Application Priority Data

Jul. 20, 2018  (CN) .......................... 201810802681.1

(51) Int. Cl.
*G06K 9/40* (2006.01)
*G06T 5/20* (2006.01)
*G06T 5/00* (2006.01)

(52) U.S. Cl.
CPC ............... *G06T 5/20* (2013.01); *G06T 5/002* (2013.01); *G06T 2207/30192* (2013.01)

(58) Field of Classification Search
CPC . G06T 5/20; G06T 5/002; G06T 2207/30192; G06T 5/003
See application file for complete search history.

(56) References Cited

U.S. PATENT DOCUMENTS 8,340,461 B2 * 12/2012 Sun .......................... G06K 9/40
                                                           382/275
9,197,789 B2 * 11/2015 Mukhopadhyay ... H04N 1/6027
(Continued)

FOREIGN PATENT DOCUMENTS

| CN | 104732494 A | 6/2015 |
|---|---|---|
| CN | 106846258 | 6/2017 |

OTHER PUBLICATIONS

Liu et al., "Large size single image fast defogging and the real time video defogging FPGA architecture", Neurocomputing, vol. 269—pp. 97-107 (2017).

*Primary Examiner* — Samir A Ahmed
(74) *Attorney, Agent, or Firm* — Knobbe, Martens, Olson & Bear LLP

(57) ABSTRACT

A method and an apparatus for processing an image are provided. A method may include: acquiring a to-be-processed foggy image, and performing minimum value filtering on the to-be-processed foggy image to obtain a grayscale image of the to-be-processed foggy image; selecting, in a descending order of pixel values, a target number of pixel points from the grayscale image, and determining an image area corresponding to the selected pixel points from the to-be-processed foggy image; acquiring pixel values of the pixel points included in the image area, and determining an atmospheric light value based on the acquired pixel values; and performing image defogging processing on the to-be-processed foggy image based on the grayscale image and the atmospheric light value to obtain a processed image. The effect of image display and the efficiency of image processing can be improved.

9 Claims, 5 Drawing Sheets

(56) References Cited

U.S. PATENT DOCUMENTS

| | | | | |
|---|---|---|---|---|
| 9,349,170 B1* | 5/2016 | Gibson | ................... | G06T 5/001 |
| 2014/0072216 A1* | 3/2014 | Fang | ....................... | G06T 5/009 |
| | | | | 382/167 |
| 2014/0140619 A1* | 5/2014 | Mukhopadhyay | ...... | G06T 5/002 |
| | | | | 382/167 |
| 2014/0205192 A1* | 7/2014 | Wang | ....................... | G06T 5/00 |
| | | | | 382/167 |
| 2014/0355903 A1* | 12/2014 | Sawada | ................... | G06T 5/002 |
| | | | | 382/263 |
| 2016/0196637 A1* | 7/2016 | Nguyen | ................. | H04N 9/646 |
| | | | | 348/224.1 |
| 2017/0206690 A1* | 7/2017 | Itoh | ........................... | G06T 7/90 |
| 2018/0038789 A1* | 2/2018 | Itoh | ........................ | G01N 21/47 |

\* cited by examiner

METHOD AND APPARATUS FOR PROCESSING IMAGE

CROSS-REFERENCE TO RELATED APPLICATIONS

This application claims priority to Chinese Patent Application No. 201810802681.1, filed on Jul. 20, 2018, titled "Method and Apparatus for Processing Image," which is hereby incorporated by reference in its entirety.

TECHNICAL FIELD

Embodiments of the present disclosure relate to the field of computer technology, specifically to a method and apparatus for processing an image.

BACKGROUND

In autumn or winter, due to the low temperature, dense fog is often formed outdoors, seriously affecting the functioning of the security monitoring system. In addition, due to environmental pollution, severe smog occurs in most cities in China, and photos taken in such weather affect both the authenticity of the record of the environment itself and the viewing effect. Therefore, how to effectively enhance these smog images becomes extremely important.

Existing image defogging processes are generally based on image enhancement algorithms such as adaptive histogram equalization, adaptive contrast, and tone enhancement.

SUMMARY

Embodiments of the present disclosure provide a method and apparatus for processing an image.

In a first aspect, embodiments of the present disclosure provide a method for processing an image, including: acquiring a to-be-processed foggy image, and performing minimum value filtering on the to-be-processed foggy image to obtain a grayscale image of the to-be-processed foggy image; selecting, in a descending order of pixel values, a target number of pixel points from the grayscale image, and determining an image area corresponding to the selected pixel points from the to-be-processed foggy image; acquiring pixel values of the pixel points included in the image area, and determining an atmospheric light value based on the acquired pixel values; and performing image defogging processing on the to-be-processed foggy image based on the grayscale image and the atmospheric light value to obtain a processed image.

In some embodiments, the determining an atmospheric light value based on the acquired pixel values includes: determining a largest pixel value in the acquired pixel values as the atmospheric light value.

In some embodiments, the performing minimum value filtering on the to-be-processed foggy image to obtain a grayscale image of the to-be-processed foggy image, includes: performing minimum value filtering on the to-be-processed foggy image to obtain an initial grayscale image of the to-be-processed foggy image; and performing noise reduction processing on the obtained initial grayscale image to obtain the grayscale image of the to-be-processed foggy image.

In some embodiments, the performing noise reduction processing on the obtained initial grayscale image includes: performing guided filtering on the obtained initial grayscale image.

In some embodiments, the selecting, a target number of pixel points from the grayscale image includes: selecting the target number of pixel points from the grayscale image such that the selected number of pixel points accounts for 0.1% of a number of pixel points included in the grayscale image.

In some embodiments, the acquiring a to-be-processed foggy image, includes: acquiring a foggy video sent by a target mobile terminal, where the foggy video is a video obtained by shooting a foggy scene by the target mobile terminal; and selecting a foggy image from a foggy image sequence corresponding to the foggy video as the to-be-processed foggy image.

In a second aspect, embodiments of the present disclosure provide an apparatus for processing an image, including: a filtering unit, configured to acquire a to-be-processed foggy image, and perform minimum value filtering on the to-be-processed foggy image to obtain a grayscale image of the to-be-processed foggy image; a selection unit, configured to select, in a descending order of pixel values, a target number of pixel points from the grayscale image, and determine an image area corresponding to the selected pixel points from the to-be-processed foggy image; a determination unit, configured to acquire pixel values of the pixel points included in the image area, and determine an atmospheric light value based on the acquired pixel values; and a processing unit, configured to perform image defogging processing on the to-be-processed foggy image based on the grayscale image and the atmospheric light value to obtain a processed image.

In some embodiments, the determination unit is further configured to: determine a largest pixel value in the acquired pixel values as the atmospheric light value.

In some embodiments, the filtering unit includes: a filtering module, configured to perform minimum value filtering on the to-be-processed foggy image to obtain an initial grayscale image of the to-be-processed foggy image; and a processing module, configured to perform noise reduction processing on the obtained initial grayscale image to obtain the grayscale image of the to-be-processed foggy image.

In some embodiments, the processing module is further configured to: perform guided filtering on the obtained initial grayscale image.

In some embodiments, the selection unit is further configured to: select the target number of pixel points from the grayscale image such that the selected number of pixel points accounts for 0.1% of a number of pixel points included in the grayscale image.

In some embodiments, the filtering unit further includes: an acquisition module, configured to acquire a foggy video sent by a target mobile terminal, where the foggy video is a video obtained by shooting a foggy scene by the target mobile terminal; and a selection module, configured to select a foggy image from a foggy image sequence corresponding to the foggy video as the to-be-processed foggy image.

In a third aspect, embodiments of the present disclosure provide a server, including: one or more processors; and a storage apparatus, storing one or more programs thereon, the one or more programs, when executed by the one or more processors, cause the one or more processors to implement the method for processing an image according to any one of the embodiments.

In a fourth aspect, embodiments of the present disclosure provide a computer readable medium, storing a computer program thereon, the program, when executed by a processor, implements the method for processing an image according to any one of the embodiments.

According to the method and apparatus for processing an image provided by some embodiments of the present disclosure, a to-be-processed foggy image is acquired, and minimum value filtering is performed on the to-be-processed foggy image to obtain a grayscale image of the to-be-processed foggy image, a target number of pixel points is selected from the grayscale image in a descending order of pixel values, and an image area corresponding to the selected pixel points is determined from the to-be-processed foggy image, pixel values of the pixel points included in the image area are acquired, and an atmospheric light value is acquired based on the acquired pixel values, and image defogging processing is further performed on the to-be-processed foggy image based on the grayscale image and the atmospheric light value to obtain a processed image, thereby effectively utilizing the grayscale image of the to-be-processed foggy image to determine the atmospheric light value, and image defogging processing is performed on the to-be-processed foggy image based on the grayscale image and the atmospheric light value. The method is simple and easy, which improves the effect of image display while improving the efficiency of image processing.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that embodiments in the present disclosure and features in the embodiments may be combined with each other on a non-conflict basis. Features of the present disclosure will be described below in detail with reference to the accompanying drawings and in combination with embodiments.

Figure 1:
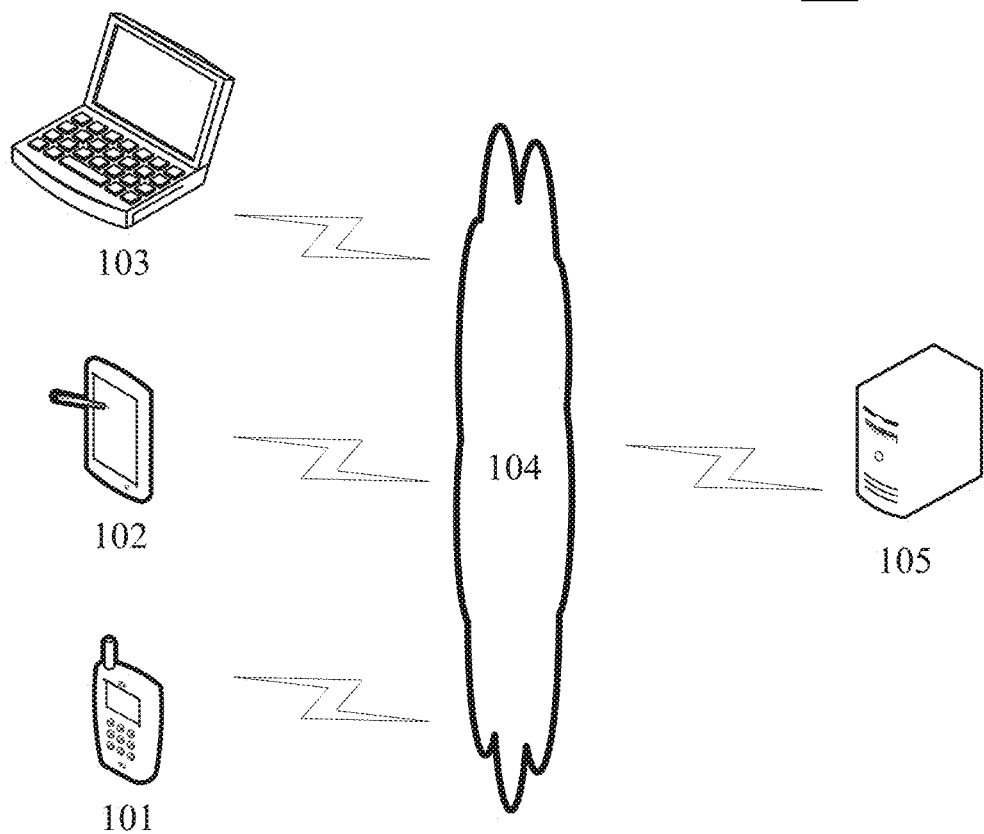
FIG. 1 is an example system architecture diagram to which an embodiment may be applied.

FIG. 1 illustrates an example system architecture 100 to which an embodiment of a method for processing an image or an apparatus for processing an image may be applied.

As shown in FIG. 1, the system architecture 100 may include terminal devices 101, 102, 103, a network 104, and a server 105. The network 104 is configured to provide a communication link medium between the terminal devices 101, 102, 103 and the server 105. The network 104 may include a variety of connections, such as wired, wireless communication links, or optic fibers.

A user may interact with the server 105 via the network 104 using the terminal devices 101, 102, 103 to receive or transmit messages and the like. Various communication client applications, such as image processing applications, beautifying software, search applications, and instant communication tools, may be installed on the terminal devices 101, 102, and 103.

The terminal devices 101, 102, 103 may be hardware or software. When being hardware, the terminal devices 101, 102, 103 may be various electronic devices having display screens and having information interaction functions, including but not limited to smart phones, tablets, e-book readers, MP3 players (Moving Picture Experts Group Audio Layer III), MP4 (Moving Picture Experts Group Audio Layer IV) players, laptop portable computers and desktop computers, and so on. When being software, the terminal devices 101, 102, 103 may be installed in the above-listed electronic devices. They may be implemented as a plurality of software or software modules (e.g., a plurality of software or software modules for providing distributed services), or as a single software or software module, which is not specifically limited here.

The server 105 may be a server that provides various services, such as an image processing server that processes images transmitted by the terminal devices 101, 102, 103. The image processing server may process such as analyze acquired data such as a to-be-processed foggy image, and feed back a processing result (e.g., a processed image) to the terminal devices.

It should be noted that a method for processing an image provided by some embodiments of the present disclosure is generally executed by the server 105. Accordingly, the apparatus for processing an image is generally provided in the server 105.

It should be noted that the server may be hardware or software. When being hardware, the server may be implemented as a distributed server cluster composed of multiple servers, or as a single server. When being software, the server may be implemented as a plurality of software or software modules (e.g., a plurality of software or software modules for providing distributed services), or as a single software or software module, which is not specifically limited here.

It should be noted that the numbers of the terminal device, the network and the server in FIG. 1 are merely illustrative. Any number of terminal device, network and server may be provided based on the implementation requirements. In particular, in the case where the data used in the to-be-processed foggy image or the process of obtaining the processed image does not need to be acquired remotely, the above system architecture may not include the network and the terminal device, but only the server.

Figure 2:
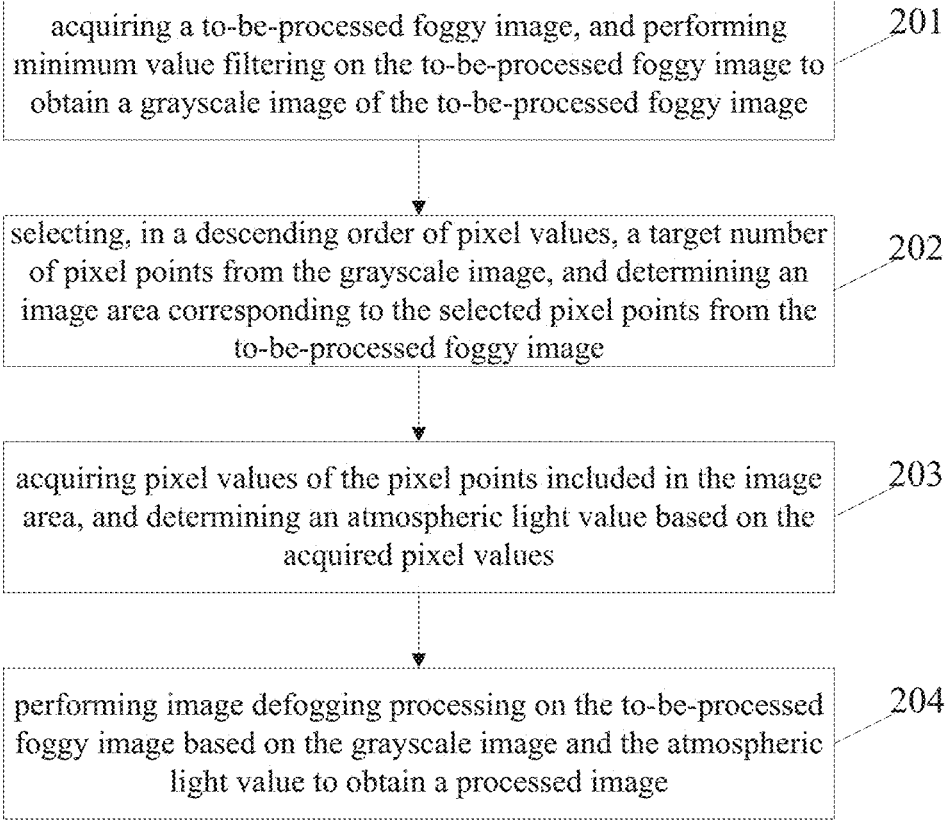
FIG. 2 is a flowchart of an embodiment of a method for processing an image.

With further reference to FIG. 2, a flow 200 of an embodiment of a method for processing an image is illustrated. The method for processing an image includes the following steps 201 to 204.

Step 201 includes acquiring a to-be-processed foggy image, and performing minimum value filtering on the to-be-processed foggy image to obtain a grayscale image of the to-be-processed foggy image.

In the present embodiment, an executing body (for example, the server shown in FIG. 1) of the method for processing an image may acquire the to-be-processed foggy image from an electronic device (for example, the terminal devices described in FIG. 1) that is locally or in communication connection therewith through a wired connection or a wireless connection, and further perform minimum value filtering on the acquired to-be-processed foggy image to obtain the grayscale image of the to-be-processed foggy image. The to-be-processed foggy image may be a foggy image to which image defogging is to be performed. A foggy image may be an image obtained by shooting a foggy (fog or smog) scene. The grayscale image of the to-be-processed foggy image may be used to represent the fog concentration corresponding to each pixel point in the to-be-processed foggy image.

In practice, a fog-free image usually includes bright colors or projections of buildings, reflections of leaves, etc. For such images, the pixels included in the image always have pixel values of at least one color channel approaching zero. In contrast, since the foggy image tends to appear to be gray, the pixel values of the pixel points included therein are usually not small. As such, the executing body can obtain the grayscale image for representing the fog concentration corresponding to each pixel point in the to-be-processed foggy image by performing the minimum value filtering on the to-be-processed foggy image.

It should be noted that the minimum value filtering is an existing technology widely studied and applied at present, and detailed description thereof will be omitted.

In the present embodiment, the to-be-processed foggy image is usually a color image. In this case, with regard to performing minimum value filtering on the to-be-processed foggy image, the executing body needs to first determine the minimum color value from the color values corresponding to color channels of the pixel points of the to-be-processed foggy image, and then performs minimum value filtering on the to-be-processed foggy image based on the minimum color value corresponding to the pixel point to obtain a grayscale image of the to-be-processed foggy image. Specifically, the executing body may directly determine a result image obtained by performing the minimum value filtering as the grayscale image of the to-be-processed foggy image, or process the result image to obtain a processed image, and further determine the processed image as the grayscale image of the to-be-processed foggy image.

In some alternative implementations of the present embodiment, the executing body may perform minimum value filtering on the to-be-processed foggy image by the following steps to obtain the grayscale image of the to-be-processed foggy image: first, the executing body may perform the minimum value filtering on the to-be-processed foggy image to obtain an initial grayscale image of the to-be-processed foggy image. The grayscale image is the result image; then, the executing body may perform noise reduction processing on the obtained initial grayscale image to obtain the grayscale image of the to-be-processed foggy image. It should be noted that the executing body may perform noise reduction processing, such as mean filtering, or Gaussian filtering, in any one of the methods preset by those skilled in the art.

In some alternative implementations of the present embodiment, the executing body may perform guided filtering on the obtained initial grayscale image to realize noise reduction on the initial grayscale image.

It may be understood that in the present embodiment, the shape and size of the obtained grayscale image of the to-be-processed foggy image are respectively the same as the shape and size of the to-be-processed foggy image, and the pixel points in the obtained grayscale image have corresponding relationships with the pixel points in the to-be-processed foggy image.

Step 202 includes selecting, in a descending order of pixel values, a target number of pixel points from the grayscale image, and determining an image area corresponding to the selected pixel points from the to-be-processed foggy image.

In the present embodiment, based on the grayscale image corresponding to the to-be-processed foggy image obtained in step 201, the executing body may select, in the descending order of pixel values of the pixel points included in the grayscale image, the target number of pixel points from the grayscale image, and determine the image area corresponding to the selected pixel points from the to-be-processed foggy image. The pixel points in the image area determined from the to-be-processed foggy image have one-to-one correspondences with the pixel points selected from the grayscale image. Specifically, the executing body may first determine a candidate image area including pixel points selected from the grayscale image, and then determine an image area corresponding to the to-be-processed foggy image based on the position of the candidate image area in the grayscale image. Or, the executing body may first determine candidate pixel points corresponding to the selected pixel points from the to-be-processed foggy image, and then determine an area including the candidate pixel points as the image area corresponding to the to-be-processed foggy image.

In the present embodiment, the target number may be a number preset by those skilled in the art, or may be a number determined based on the number of pixel points included in the grayscale image to obtain the image area.

In some alternative implementations of the present embodiment, the executing body may select the target number of pixel points from the grayscale image such that the selected number of pixel points accounts for 0.1% of the number of pixel points included in the grayscale image.

In this implementation, determining the atmospheric light value by using 0.1% of the pixel points included in the grayscale image may reduce the number of pixel points used to determine the atmospheric light value and improve information processing efficiency while obtaining an accurate result.

Step 203 includes acquiring pixel values of the pixel points included in the image area, and determining an atmospheric light value based on the acquired pixel values.

In the present embodiment, based on the image area determined in step 202, the executing body may acquire pixel values of the pixel points included in the image area, and determine the atmospheric light value based on the acquired pixel values. The atmospheric light value may be used to represent the intensity of light in the atmosphere.

It may be understood that the fog in the actual area corresponding to a brighter image area in the grayscale image is denser, that is, the pixel values of the image area corresponding to the actual area in the to-be-processed foggy image reflect more atmospheric information than other information. Therefore, when calculating the atmospheric light value, the executing body may first determine the image area corresponding to the actual area where the fog is relatively rich from the to-be-processed foggy image, and determine the atmospheric light value based on the pixel values of the pixel points included in the image area.

In practice, the executing body may determine the atmospheric light value based on the pixel values of the acquired pixel points included in the image area in various methods. For example, the executing body may perform a mean calculation on the pixel values of the acquired pixel points to obtain a calculation result, and then determine the obtained calculation result as the atmospheric light value.

In some alternative implementations of the present embodiment, the executing body may also determine the largest pixel value in the acquired pixel values as the atmospheric light value.

Step 204 includes performing image defogging processing on the to-be-processed foggy image based on the grayscale image and the atmospheric light value to obtain a processed image.

In the present embodiment, based on the grayscale image obtained in step 201 and the atmospheric light value obtained in step 203, the executing body may perform image defogging processing on the to-be-processed foggy image to obtain the processed image.

It may be understood that an image obtained in a foggy environment generally includes the following two parts: light components of the reflected light of an object itself, the reflected light being attenuated by the fog; and light components in the atmosphere. Here, the more the reflected light of the object itself is attenuated by the fog, the more dense the concentration of the fog. The grayscale image above may be used to represent the fog concentration corresponding to each pixel point in the to-be-processed foggy image, that is, may be used to represent the amount of attenuation corresponding to each pixel point in the to-be-processed foggy image. Further, by using the grayscale image and the atmospheric light value, the image (i.e., the processed image) reflecting the physical properties (reflection of light) of the object itself may be obtained reversely.

In the present embodiment, the executing body may perform image defogging processing on the to-be-processed foggy image by the following steps: the executing body may use the grayscale image, the atmospheric light value, and the to-be-processed foggy image as known quantities of a pre-established physical imaging model, and the processed image corresponding to the to-be-processed foggy image as unknown quantities of the physical imaging model, perform a derivation calculation on the processed image to obtain a processed image corresponding to the to-be-processed foggy image. It should be noted that, here, the physical imaging model is an atmospheric scattering model. The atmospheric scattering model is an existing technology widely studied and applied at present, and detailed description thereof will be omitted.

Figure 3:
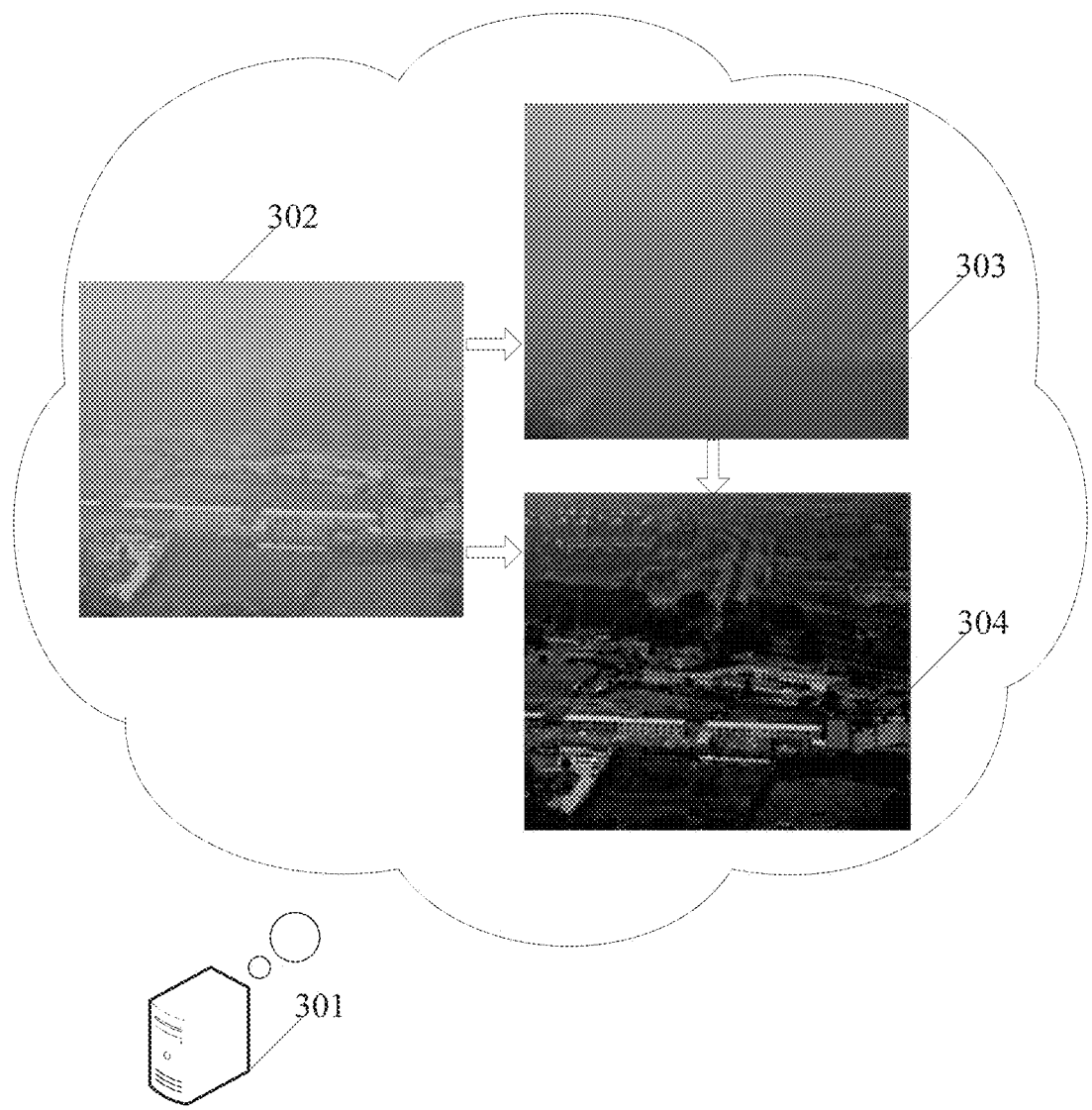
FIG. 3 is a schematic diagram of an application scenario of the method for processing an image according to an embodiment.

With further reference to FIG. 3, FIG. 3 is a schematic diagram of an application scenario of the method for processing an image according to the present embodiment. In the application scenario of FIG. 3, an image processing server 301 may first acquire a to-be-processed foggy image 302. The image processing server 301 may then perform minimum value filtering on the to-be-processed foggy image 302 to obtain a grayscale image 303 of the to-be-processed foggy image 302. Next, the image processing server 301 may select, in a descending order of pixel values, a target number of pixel points from the grayscale image 303, and determine an image area corresponding to the selected pixel points from the to-be-processed foggy image 301. Then, the image processing server 301 may acquire pixel values of the pixel points included in the image area, and determine an atmospheric light value based on the acquired pixel values. Finally, the image processing server 301 may perform image defogging processing on the to-be-processed foggy image 302 based on the grayscale image 303 and the atmospheric light value to obtain a processed image 304.

A method provided by some embodiments of the present disclosure effectively utilizes the grayscale image of the to-be-processed foggy image to determine the atmospheric light value, and performs image defogging processing on the to-be-processed foggy image based on the grayscale image and the atmospheric light value, thereby improving the effect of image display and the efficiency of image processing.

Figure 4:
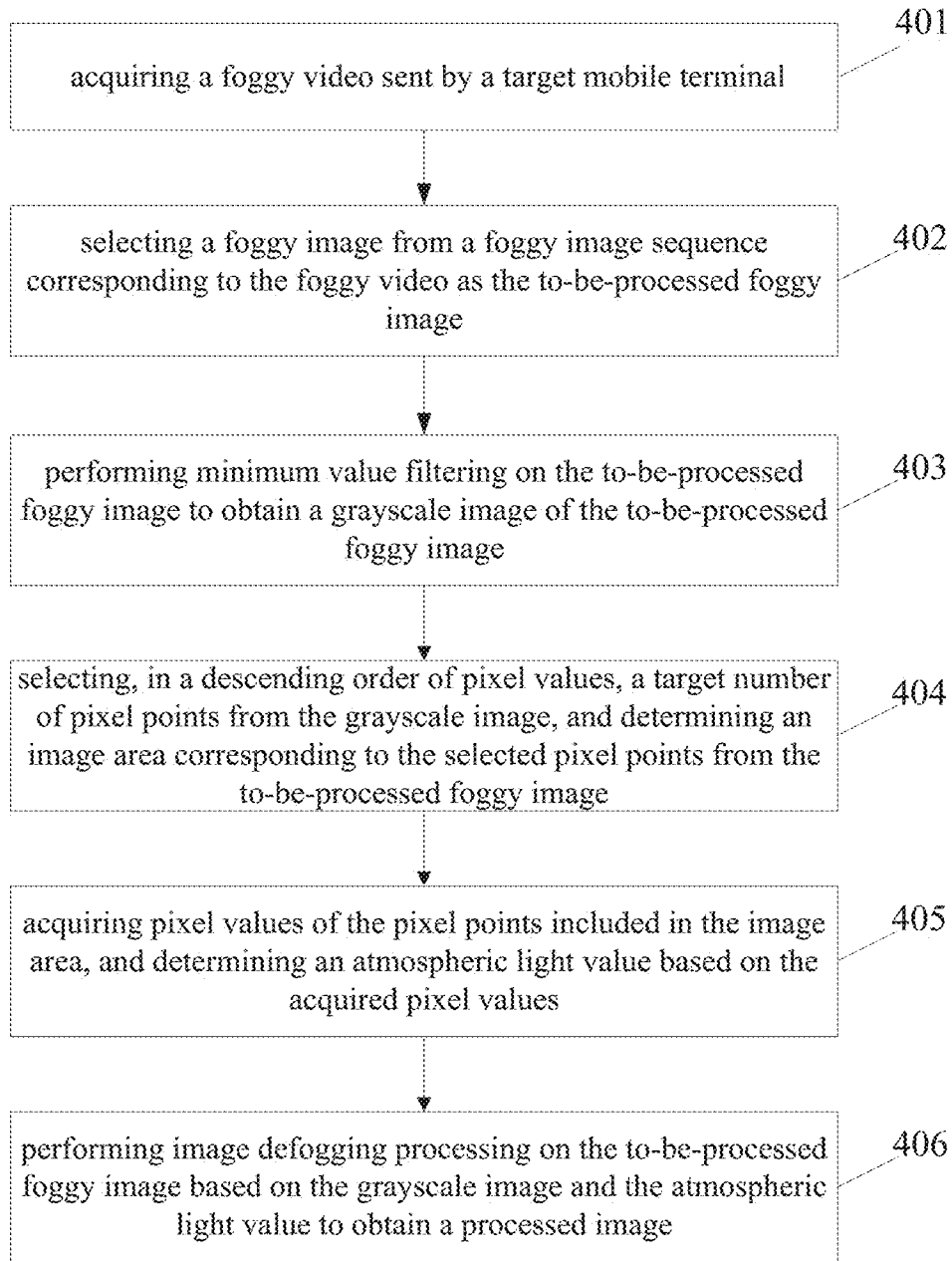
FIG. 4 is a flowchart of another embodiment of the method for processing an image.

With further reference to FIG. 4, a flow 400 of another embodiment of the method for processing an image is illustrated. The flow 400 of the method for processing an image includes the following steps 401 to 406.

Step 401 includes acquiring a foggy video sent by a target mobile terminal.

In the present embodiment, an electronic device (for example, the server shown in FIG. 1) on which the method for processing an image runs may acquire a foggy video sent by the target mobile terminal through a wired connection or a wireless connection. The target mobile terminal may be a mobile terminal that is in communication connection with the executing body. The mobile terminal may be either hardware or software. Specifically, when being hardware, the mobile terminal may be various electronic devices having mobile functions, including but not limited to drones, unmanned vehicles, intelligent robots, etc.; when being software, the mobile terminal may be installed in the above-listed hardware. The foggy video is a video obtained by shooting a foggy (fog, smog) scene by the target mobile terminal.

Step 402 includes selecting a foggy image from a foggy image sequence corresponding to the foggy video as the to-be-processed foggy image.

It may be understood that the smoggy video is essentially a foggy image sequence arranged in chronological order. Therefore, in the present embodiment, based on the foggy video obtained in step 401, the executing body may select the foggy image from the foggy image sequence corresponding to the foggy video as the to-be-processed foggy image. The to-be-processed foggy image may be the foggy image to be subjected to an image defogging processing.

It should be noted that the executing body may select the foggy image from the foggy image sequence as the to-be-processed foggy image in various methods. For example, the foggy images may be sequentially selected according to an arrangement order of the images in the foggy image sequence as the to-be-processed foggy images, or a foggy image with poor definition may be selected from the foggy image sequence as the to-be-processed foggy image.

Step 403 includes performing minimum value filtering on the to-be-processed foggy image to obtain a grayscale image of the to-be-processed foggy image.

In the present embodiment, based on the to-be-processed foggy image obtained in step 402, the executing body may perform minimum value filtering on the acquired to-be-processed foggy image to obtain a grayscale image of the to-be-processed foggy image. The grayscale image of the to-be-processed foggy image may be used to represent the fog concentration corresponding to each pixel point in the to-be-processed foggy image.

Step 404 includes selecting, in a descending order of pixel values, a target number of pixel points from the grayscale image, and determining an image area corresponding to the selected pixel points from the to-be-processed foggy image.

In the present embodiment, based on the grayscale image corresponding to the to-be-processed foggy image obtained in step 403, the executing body may select, in a descending order of pixel values of the pixel points included in the grayscale image, the target number of pixel points from the grayscale image, and determine an image area corresponding to the selected pixel points from the to-be-processed foggy image.

Step 405 includes acquiring pixel values of the pixel points included in the image area, and determining an atmospheric light value based on the acquired pixel values.

In the present embodiment, based on the image area determined in step 404, the executing body may acquire pixel values of the pixel points included in the image area, and determine the atmospheric light value based on the acquired pixel values. The atmospheric light value may be used to represent the intensity of light in the atmosphere.

Step 406 includes performing image defogging processing on the to-be-processed foggy image based on the grayscale image and the atmospheric light value to obtain a processed image.

In the present embodiment, based on the grayscale image obtained in step 403 and the atmospheric light value obtained in step 405, the executing body may perform image defogging processing on the to-be-processed foggy image to obtain the processed image.

It should be noted that the steps 403, 404, 405, and 406 may be implemented in a method similar to steps 201, 202, 203, and 204 in the foregoing embodiment. Correspondingly, the above descriptions of the steps 201, 202, 203, and 204 are also applicable to the steps 403, 404, 405, and 406 of the present embodiment, and detailed description thereof will be omitted.

As can be seen from FIG. 4, the flow 400 of the method for processing an image in the present embodiment highlights the step of extracting a foggy image from a foggy video sent by a target mobile terminal as the to-be-processed foggy image, as compared with the embodiment corresponding to FIG. 2. Therefore, the solution described in the present embodiment may improve the interactivity between the electronic devices that are in communication connection with each other, and perform image defogging processing on the foggy image corresponding to the foggy video, which is equivalent to performing video defogging processing on the smoggy video, expanding the scope of application of image processing.

Figure 5:
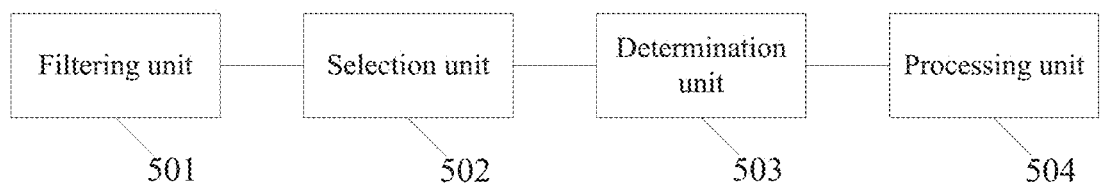
FIG. 5 is a schematic structural diagram of an embodiment of an apparatus for processing an image.

With further reference to FIG. 5, as an implementation of the method shown in the above figures, the present disclosure provides an embodiment of an apparatus for processing an image, and the apparatus embodiment corresponds to the method embodiment as shown in FIG. 2, and the apparatus may be specifically applied to various electronic devices.

As shown in FIG. 5, the apparatus 500 for processing an image of the present embodiment includes: a filtering unit 501, a selection unit 502, a determination unit 503 and a processing unit 504. The filtering unit 501 is configured to acquire a to-be-processed foggy image, and perform minimum value filtering on the to-be-processed foggy image to obtain a grayscale image of the to-be-processed foggy image. The selection unit 502 is configured to select, in a descending order of pixel values, a target number of pixel points from the grayscale image, and determine an image area corresponding to the selected pixel points from the to-be-processed foggy image. The determination unit 503 is configured to acquire pixel values of the pixel points included in the image area, and determine an atmospheric light value based on the acquired pixel values. The processing unit 504 is configured to perform image defogging processing on the to-be-processed foggy image based on the grayscale image and the atmospheric light value to obtain a processed image.

In the present embodiment, the filtering unit 501 of the apparatus 500 for processing an image may acquire a to-be-processed foggy image from an electronic device (for example, the terminal devices described in FIG. 1) that is locally or in communication connection therewith through a wired connection or a wireless connection, and further perform minimum value filtering on the acquired to-be-processed foggy image to obtain a grayscale image of the to-be-processed foggy image. The to-be-processed foggy image may be a foggy image to which image defogging is to be performed. A foggy image may be an image obtained by shooting a foggy (fog, smog) scene. The grayscale image of the to-be-processed foggy image may be used to represent the fog concentration corresponding to each pixel point in the to-be-processed foggy image.

In the present embodiment, the to-be-processed foggy image is usually a color image. In this case, with regard to performing minimum value filtering on the to-be-processed foggy image, the filtering unit 501 needs to first determine the minimum color value from the color values corresponding to color channels of the pixel points of the to-be-processed foggy image, and then performs minimum value filtering on the to-be-processed foggy image based on the minimum color value corresponding to the pixel point to obtain a grayscale image of the to-be-processed foggy image.

In the present embodiment, based on the grayscale image corresponding to the to-be-processed foggy image obtained by the filtering unit 501, the selection unit 502 may select, in a descending order of pixel values of the pixel points included in the grayscale image, a target number of pixel points from the grayscale image, and determine an image area corresponding to the selected pixel points from the to-be-processed foggy image. The pixel points in the image area determined from the to-be-processed foggy image have one-to-one correspondences with the pixel points selected from the grayscale image.

In the present embodiment, the target number may be a number preset by those skilled in the art, or may be a number determined, based on the number of pixel points included in the grayscale image, for obtaining the image area.

In the present embodiment, based on the image area determined by the selection unit 502, the determination unit 503 may acquire pixel values of the pixel points included in the image area, and determine an atmospheric light value based on the acquired pixel values. The atmospheric light value may be used to represent the intensity of light in the atmosphere.

In the present embodiment, based on the grayscale image obtained by the filtering unit 501 and the atmospheric light value obtained by the determination unit 503, the processing unit 504 may perform image defogging processing on the to-be-processed foggy image to obtain a processed image.

In some alternative implementations of the present embodiment, the determination unit 503 may be further configured to: determine the largest pixel value in the acquired pixel values as the atmospheric light value.

In some alternative implementations of the present embodiment, the filtering unit 501 may include: a filtering module (not shown in the figure), configured to perform minimum value filtering on the to-be-processed foggy image to obtain an initial grayscale image of the to-be-processed foggy image; and a processing module (not shown in the figure), configured to perform noise reduction processing on the obtained initial grayscale image to obtain the grayscale image of the to-be-processed foggy image.

In some alternative implementations of the present embodiment, the processing module may be further configured to: perform guided filtering on the obtained initial grayscale image.

In some alternative implementations of the present embodiment, the selection unit 502 may be further configured to: select a target number of pixel points from the grayscale image such that the selected number of pixel points accounts for 0.1% of the number of pixel points included in the grayscale image.

In some alternative implementations of the present embodiment, the filtering unit 501 may further include: an acquisition module (not shown in the figure), configured to acquire a foggy video sent by a target mobile terminal, where the foggy video is a video obtained by shooting a foggy scene by the target mobile terminal; and a selection module (not shown in the figure), configured to select a foggy image from a foggy image sequence corresponding to the foggy video as the to-be-processed foggy image.

It may be understood that the units described in the apparatus 500 correspond to the various steps in the method described with reference to FIG. 2. Thus, the operations, features, and resulting advantageous effects described for the method are equally applicable to the apparatus 500 and the units contained therein, and detailed description thereof will be omitted.

The apparatus 500 provided by the above embodiment of the present disclosure effectively utilizes the grayscale image of the to-be-processed foggy image to determine the atmospheric light value, and performs image defogging processing on the to-be-processed foggy image based on the grayscale image and the atmospheric light value, thereby improving the effect of image display and the efficiency of image processing.

Figure 6:
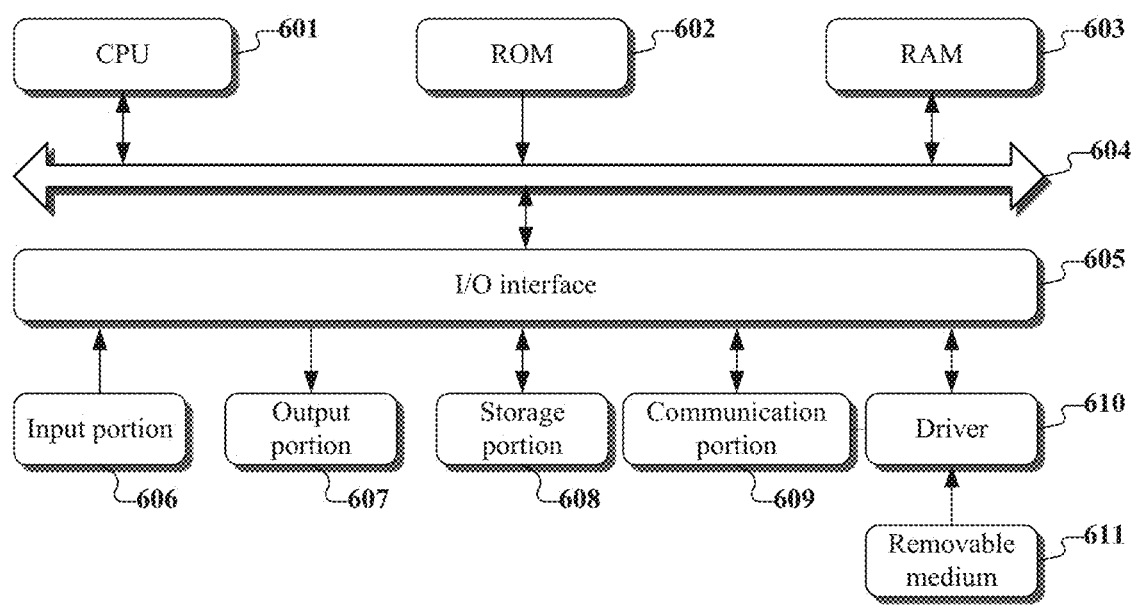
FIG. 6 is a schematic structural diagram of a computer system adapted to implement a server of some embodiments.

With further reference to FIG. 6, a schematic structural diagram of a computer system 600 adapted to implement a server of some embodiments is shown. The server shown in FIG. 6 is merely an example, and should not impose any limitation on the function and scope of use of embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in some embodiments of the present disclosure may be implemented by means of software or hardware. The described units may also be provided in a processor, for example, may be described as: a processor including a filtering unit, a selection unit, a determination unit and a processing unit. Here, the names of these units do not in some cases constitute limitations to such units themselves. For example, the processing unit may also be described as "a unit for performing image defogging processing on the to-be-processed foggy image".

In another aspect, the present disclosure further provides a computer readable medium. The computer readable medium may be included in the server in the above described embodiments, or a stand-alone computer readable medium not assembled into the server. The computer readable medium stores one or more programs. The one or more programs, when executed by the server, cause the server to: acquire a to-be-processed foggy image, and perform minimum value filtering on the to-be-processed foggy image to obtain a grayscale image of the to-be-processed foggy image; select, in a descending order of pixel values, a target number of pixel points from the grayscale image, and determine an image area corresponding to the selected pixel points from the to-be-processed foggy image; acquire pixel values of the pixel points included in the image area, and determine an atmospheric light value based on the acquired pixel values; and perform image defogging processing on the to-be-processed foggy image based on the grayscale image and the atmospheric light value to obtain a processed image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing an image, the method comprising:
   acquiring a to-be-processed foggy image, and performing minimum value filtering on the to-be-processed foggy image to obtain a grayscale image of the to-be-processed foggy image;
   selecting, in a descending order of pixel values, a target number of pixel points from the grayscale image, and determining an image area corresponding to the selected pixel points from the to-be-processed foggy image;
   acquiring pixel values of the pixel points included in the image area, and determining an atmospheric light value based on the acquired pixel values; and
   performing image defogging processing on the to-be-processed foggy image based on the grayscale image and the atmospheric light value to obtain a processed image, wherein the image defogging processing on the to-be-processed foggy image comprises: using the grayscale image, the atmospheric light value, and the to-be-processed foggy image as known quantities of a pre-established physical imaging model, and the processed image as unknown quantities of the physical imaging model, performing a derivation calculation to obtain the processed image.

2. The method according to claim 1, wherein the performing minimum value filtering on the to-be-processed foggy image to obtain a grayscale image of the to-be-processed foggy image, comprises:
   performing minimum value filtering on the to-be-processed foggy image to obtain an initial grayscale image of the to-be-processed foggy image; and
   performing noise reduction processing on the obtained initial grayscale image to obtain the grayscale image of the to-be-processed foggy image.

3. The method according to claim 2, wherein the performing noise reduction processing on the obtained initial grayscale image, comprises:
   performing guided filtering on the obtained initial grayscale image.

4. The method according to claim 1, wherein the selecting, a target number of pixel points from the grayscale image, comprises:
   selecting the target number of pixel points from the grayscale image such that the selected number of pixel points accounts for 0.1% of a number of pixel points included in the grayscale image.

5. An apparatus for processing an image, the apparatus comprising:
   at least one processor; and
   a memory storing instructions, wherein the instructions, when executed by the at least one processor, cause the at least one processor to perform operations, the operations comprising:
   acquiring a to-be-processed foggy image, and performing minimum value filtering on the to-be-processed foggy image to obtain a grayscale image of the to-be-processed foggy image;
   selecting, in a descending order pixel values, a target number of pixel points from the grayscale image, and determining an image area corresponding to the selected pixel points from the to-be-processed foggy image;
   acquiring pixel values of the pixel points included in the image area, and determining an atmospheric light value based on the acquired pixel values; and
   performing image defogging processing on the to-be-processed foggy image based on the grayscale image and the atmospheric light value to obtain a processed image, wherein the image defogging processing on the to-be-processed foggy image comprises: using the grayscale image, the atmospheric light value, and the to-be-processed foggy image as known quantities of a pre-established physical imaging model, and the processed image as unknown quantities of the physical imaging model, performing a derivation calculation to obtain the processed image.

6. The apparatus according to claim 5, wherein the performing minimum value filtering on the to-be-processed foggy image to obtain a grayscale image of the to-be-processed foggy image, comprises:
   performing minimum value filtering on the to-be-processed foggy image to obtain an initial grayscale image of the to-be-processed foggy image; and performing noise reduction processing on the obtained initial grayscale image to obtain the grayscale image of the to-be-processed foggy image.

7. The apparatus according to claim 6, wherein the performing noise reduction processing on the obtained initial grayscale image, comprises:

performing guided filtering on the obtained initial grayscale image.

8. The apparatus according to claim 5, wherein the selecting, a target number of pixel points from the grayscale image, comprises:

selecting the target number of pixel points from the grayscale image such that the selected number of pixel points accounts for 0.1% of a number of pixel points included in the grayscale image.

9. A non-transitory computer readable medium, storing a computer program thereon, the program, when executed by a processor, causes the processor to perform operations, the operations comprising:

acquiring a to-be-processed foggy image, and performing minimum value filtering on the to-be-processed foggy image to obtain a grayscale image of the to-be-processed foggy image;

selecting, in a descending order of pixel values, a target number of pixel points from the grayscale image, and determining an image area corresponding to the selected pixel points from the to-be-processed foggy image;

acquiring pixel values of the pixel points included in the image area, and determining an atmospheric light value based on the acquired pixel values; and performing image defogging processing on the to-be-processed foggy image based on the grayscale image and the atmospheric light value to obtain a processed image, wherein the image defogging processing on the to-be-processed foggy image comprises: using the grayscale image, the atmospheric light value, and the to-be-processed foggy image as known quantities of a pre-established physical imaging model, and the processed image as unknown quantities of the physical imaging model, performing a derivation calculation to obtain the processed image.

\* \* \* \* \*